United States Patent [19]

Eichenauer et al.

[11] Patent Number: 4,885,337

[45] Date of Patent: Dec. 5, 1989

[54] PROCESS FOR THE PREPARATION OF THERMOPLASTIC MOULDING COMPOSITIONS

[75] Inventors: Herbert Eichenauer, Dormagen; Alfred Pischtschan, Kuerten; Karl-Heinz Ott, Leverkusen, all of Fed. Rep. of Germany

[73] Assignee: Bayer Aktiengesellschaft, Leverkusen-Bayerwerk, Fed. Rep. of Germany

[21] Appl. No.: 69,967

[22] Filed: Jul. 6, 1987

[30] Foreign Application Priority Data

Jul. 15, 1986 [DE] Fed. Rep. of Germany ....... 3623758

[51] Int. Cl.$^4$ ...................... C08L 47/00; C08L 51/04
[52] U.S. Cl. ........................................ 525/75; 525/80; 525/84; 525/85; 525/261; 525/310; 525/316
[58] Field of Search ..................... 525/84, 261, 75, 80, 525/85

[56] References Cited

U.S. PATENT DOCUMENTS 4,104,328  8/1978  Swoboda et al. .................... 525/84

*Primary Examiner*—Jacob Ziegler
*Attorney, Agent, or Firm*—Connolly and Hutz

[57] ABSTRACT

Process for the preparation of a thermoplastic moulding composition of 10 to 65% by weight of at least one graft polymer which is obtainable by emulsion polymerization of styrene and acrylonitrile in a weight ratio of 90:10 to 50:50, it being possible for all or some of the styrene to be replaced by α-methylstyrene or methyl methacrylate, in the presence of at least one rubber base, and the weight ratio of monomers employed to rubber polymer employed being 20:80 to 70:30, and 90 to 35% by weight of a copolymer of styrene and acrylonitrile in a weight ratio of 90:10 to 50:50, it being possible for all or some of the styrene to be replaced by α-methylstyrene or methyl methacrylate, wherein, to prepare the graft polymer, the grafting monomers and 0.05 to 1.00 part by weight (per 100 parts by weight of grafting monomer) of a mercaptan are added stepwise to the latex of the rubber base over a period of time, the part amount of the monomer added in each time interval $\Delta t_{n+1}$ being 0.30 to 0.95 times the amount of monomer added in the preceding time interval $\Delta t_n$ at least in the first half of the period of time, and the total period of time comprising n time intervals where n=3 to 30, and each time interval $\Delta t$ being 5 to 100 minutes long.

5 Claims, No Drawings

PROCESS FOR THE PREPARATION OF THERMOPLASTIC MOULDING COMPOSITIONS

The invention relates to a process for the preparation of thermoplastic moulding compositions of the ABS type with improved properties in comparison with known ABS moulding compositions, in particular high toughness and great hardness coupled with easy processability and a good surface gloss.

ABS moulding compositions are two-phase plastics of:

I. a thermoplastic copolymer of styrene and acrylonitrile in which all or some of the styrene can be replaced by α-methylstyrene or methyl methacrylate; this copolymer, also called SAN resin or matrix resin, forms the external phase;

II. at least one graft polymer which has been prepared by a grafting reaction of one or more of the monomers mentioned under I. on a butadiene homo- or copolymer ("graft base"). This graft polymer ("elastomer phase" or "graft rubber") forms the disperse phase in the matrix resin.

The toughness of an ABS moulding composition with a constant matrix is largely determined by the graft rubber. The toughness which can be achieved with customary ABS moulding compositions is at present not always sufficient for mouldings which are subjected to high stress, for example in the vehicle interior sector, with the required certainty. There is therefore a need for graft rubbers which can be used as a basis to prepare ABS moulding compositions of increased toughness without a deterioration in the other properties, such as rigidity or hardness, processability and surface gloss.

DE-AS (German Published Specification) No. 1,813,719 discloses tough, readily processable ABS moulding compositions which are obtained by a one-stage emulsion graft polymerization, which proceeds under pressure, of 75–90 parts by weight of a monomer mixture onto 10–25 parts by weight of a mixture of two rubber latices, one of which is a pure polybutadiene and the other of which is an SBR latex with a styrene content of <50% and a certain particle size.

An ABS material which is prepared by a procedure in which a crosslinked graft copolymer with a swelling index of >20 and the matrix resin are synthesized separately and then mixed is described in DE-OS (German Published Specification) No. 1,804,763. As can be seen from the embodiment examples, although this leads to a high toughness, it also results in a poor gloss.

U.S. Pat. No. 3,509,238 describes ABS products which are prepared using two graft polymers, one of which has a low degree of grafting and the other a high degree of grafting. However, these products have inadequate properties at low temperatures.

U.S. Pat. No. 3,928,494 describes ABS products with two graft polymers of different degrees of grafting, in which the fine-particled material with the lower degree of grafting is assembled into particle aggregates by spray-drying or coagulation. Such aggregates are loosely bonded structures which are torn apart again under high temperatures and shearing forces, such as may arise, for example, during processing by injection moulding, and then do not give adequate product toughnesses.

DE-OS (German Published Specification) No. 3,304,544 describes ABS moulding compositions using graft rubbers based on a rubber mixture of a coarse-particled latex with a low degree of crosslinking and a fine-particled latex, the distance between the grafting points having to assume a defined value. Although these products have a high toughness, the hardness values are unsatisfactory.

The invention relates to a process for the preparation of a thermoplastic moulding composition of 10 to 65% by weight of at least one graft polymer which is obtainable by emulsion polymerization of styrene and acrylonitrile in a weight ratio of 90:10 to 50:50, it being possible for all or some of the styrene to be replaced by α-methylstyrene or methyl methacrylate, in the presence of at least one rubber base, and the weight ratio of monomers employed to rubber polymer employed being 20:80 to 70:30, and 90 to 35% by weight of a copolymer of styrene and acrylonitrile in a weight ratio of 90:10 to 50:50, it being possible for all or some of the styrene to be replaced by α-methylstyrene or methyl methacrylate, characterized in that, to prepare the graft polymer, the grafting monomers and 0.05 to 1.00 part by weight (per 100 parts by weight of grafting monomer) of a mercaptan are added stepwise to the latex of the rubber base over a period of time, the part amount of the monomer added in each time interval $\Delta t_{n+1}$ being 0.30 to 0.95 times, preferably 0.40 to 0.90 times and particularly preferably 0.45 to 0.85 times, the amount of monomer added in the preceding time interval $\Delta t_n$ at least in the first half of the period of time, and the total period of time comprising n time intervals where n=3 to 30, preferably 3 to 15, and each time interval $\Delta t$ being 5 to 100, preferably 10 to 90 and particularly preferably 15 to 75, minutes long.

The rubbers used here must have a glass transition temperature of less than 0° C.

Examples of suitable rubbers are:

diene rubbers, that is to say homopolymers of conjugated dienes with 4 to 8 C atoms, such as butadiene, isoprene, chloroprene or copolymers thereof with up to 60% by weight, preferably 1 to 30% by weight, of a vinyl monomer, for example acrylonitrile, methacrylonitrile, styrene, α-methylstyrene, halogenostyrenes, $C_1$–$C_4$-alkylstyrenes, $C_1$–$C_6$-alkyl acrylates and methacrylates, alkylene glycol di-acrylates and methacrylates and divinylbenzene;

acrylate rubbers, that is to say homo- and copolymers of $C_1$–$C_{10}$-alkyl acrylates, for example homopolymers of ethyl acrylate or butyl acrylate or copolymers with up to 40% by weight, preferably not more than 10% by weight, of mono-vinyl monomers, for example styrene, acrylonitrile, vinyl butyl ether, acrylic acid (esters), methacrylic acid (esters) or vinylsulphonic acid. Those acrylate rubber homo- or copolymers which contain 0.01 to 8% by weight of divinyl or polyalkyl compounds and/or n-methylolacrylamide (or -methacrylamide) derivatives which act as crosslinking agents, for example divinylbenzene or triallyl cyanurate, and in which the rubber contains C=C double bonds are preferably employed; and terpolymer rubbers, that is to say copolymers of monoolefinic hydrocarbons, for example ethylene, propylene and dienes, for example butadiene and cyclopentadiene.

Polybutadiene rubbers, SBR rubbers with up to 30% by weight of copolymerized styrene and acrylate rubbers, in particular those which have a core-shell structure, as described in DE-OS (German Published Specification) No. 3,006,804, and EPDM rubbers are preferred.

Lattices with average particle diameters ($d_{50}$) of 0.05 to 2.0 μm, preferably 0.1 to 1.0 μm, are suitable for the preparation of the moulding compositions according to the invention. The average particle diameters are determined by means of an ultracentrifuge (compare W. Scholtan, H. Lange: Kolloid.-Z. u. Z. Polymere 250, pages 782–796 (1972)). Mixtures of several lattices can also be used (compare DE-OS (German Published Specification) No. 1,813,719). These lattices are as a rule prepared by emulsion polymerization, and the required reaction conditions, auxiliaries and operating techniques are known in principle.

It is also possible, in accordance with known methods, for a fine-particled rubber polymer first to be prepared and then to be agglomerated in a known manner to produce the required particle size. Relevant techniques are described (compare European Patent Specification 0,029,613; European Patent Specification No. 0,007,810; East German Patent Specification No. 144,415; DE-AS (German Published Specification) No. 1,233,131; DE-AS (German Published Specification) No. 1,258,076; DE-OS (German Published Specification) No. 2,101,650; and U.S. Pat. No. 1,379,391).

The process can also be carried out by the so-called seed polymerization technique, in which, for example, a fine-particled butadiene polymer is first prepared and is then further polymerized to produce larger particles by further reaction with monomers containing butadiene.

In principle, rubber polymer lattices can also be prepared by emulsification of finished rubber polymers in aqueous media (compare Japanese Patent Application No. 55,125,102).

The graft polymers according to the invention are prepared by emulsion polymerization of the grafting monomers in the presence of the particular graft base in latex form at temperatures between 25° and 160° C., preferably between 40° and 90° C. The customary emulsifiers, such as alkyl sulphates, alkyl sulphonates, aralkyl sulphonates, soaps of saturated or unsaturated fatty acids and abietic or tallow oil acids which have undergone alkaline disproportionation or are hydrogenated, can be used here. Possible initiators are inorganic and organic peroxides, for example $H_2O_3_2$, di-tert.-butyl peroxide, cumene hydroperoxide, dicyclohexyl percarbonate, p-menthane hydroperoxide, azo initiators, such as, for example, azobisisobutyronitrile, inorganic persalts, such as K persulphate, K perphosphate or Na perborate, and redox systems composed of an oxidizing agent—as a rule an organic oxidizing agent—and a reducing agent, heavy metal ions additionally being present in the reaction medium (see H. Logemann in: Houben-Weyl, Methoden der organischen Chemie (Methods of Organic Chemistry), Volume 14/1, pages 263–297).

According to the invention, styrene and acrylonitrile in a weight ratio of 90:10 to 50:50, preferably 65:35 to 75:25, are employed for the grafting reaction, it being possible for all or some of the styrene to be replaced by m-methylstyrene or methyl methacrylate. Styrene/acrylonitrile mixtures are preferably used.

According to process according to the invention, the grafting monomers must be added to the rubber base in latex form within a period of time such that the part amount of monomer added in each time interval $\Delta t_{n+1}$ is 0.30 to 0.95 times, preferably 0.40 to 0.90 times and particularly preferably 0.45 to 0.85 times, the amount of monomer stated in the preceding time interval $\Delta t_n$, at least in the first half of the period of time, the total period of time comprising n time intervals where 3 to 30, preferably 3 to 15, and each time interval $\Delta t$ being 5 to 100, preferably 10 to 90 and particularly preferably 15 to 75, minutes long.

0.05 to 1.00 part by weight (per 100 parts by weight of grafting monomer), preferably 0.08 to 0.80 part by weight (per 100 parts by weight of grafting monomer), of a mercaptan must also be added together with the grafting monomers. Examples of suitable mercaptans are aliphatic mercaptans, such as ethyl-, n-propyl-, n-butyl-, tert.-butyl-, n-pentyl-, n-hexyl-, n-octyl-, n-decyl-, n-dodecyl-, tert.-dodecyl-, n-hexadecyl- and n-octadecylmercaptan, or aromatic mercaptans, such as thiophenol. Preferred mercaptans are tert.-dodecylmercaptan and n-dodecylmercaptan and mixtures thereof.

The graft polymers have a rubber content of 30 to 80% by weight, preferably 35 to 70% by weight.

To produce moulding compositions, the graft polymer is mixed with a matrix resin. Suitable matrix resins consist of, for example, copolymers of styrene and acrylonitrile in a weight ratio of 90:10 to 50:50, it being possible for all or some of the styrene to be replaced by α-methylstyrene or methyl methacrylate, and, if appropriate, it being possible for a proportion of up to 25% by weight, based on the matrix resin, of another monomer from the series comprising maleic anhydride, maleic (fumaric) acid bisalkyl esters, maleimide, N-(cyclo)-alkylmaleimide, N-(alkyl)phenylmaleimide and indene also to be used.

Details on the preparation of these resins are given, for example, in DE-AS (German Published Specification) No. 2,420,358 and DE-AS (German Published Specification) No. 2,724,360. Matrix resins prepared by bulk polymerization have proved to be particularly suitable.

To prepare the moulding composition, the graft polymer can be mixed with the matrix resin in various ways. If the matrix resin was prepared by emulsion polymerization, the lattices can be mixed and precipitated together, or they can be precipitated separately and the resulting solid substances can be mixed.

If, for example, the matrix resin is prepared by solution or bulk polymerization, the graft polymer must be precipitated separately. Known processes are used for this, for example the addition of salts and/or acids, after which the precipitated products are washed, dried and, if appropriate, converted from the powder form into a granule form. Possible mixing devices for precipitated products or granules are, for example, multi-roll mills, mixing extruders or internal kneaders.

According to the invention, the proportion of graft product makes up 10–65% by weight of the total amount, the proportion of graft polymers being lower, since not all the monomers form grafted branches. Preferred moulding compositions have the following composition:

graft product: 30–60 parts,
matrix resin: 70–40 parts, the maximum toughnesses being achieved with amounts of 40–60 parts of graft product.

The necessary or advantageous additives, for example antioxidants, UV stabilizers, peroxide-destroying agents, antistatics, lubricants, flameproofing agents, fillers or reinforcing substances (glass fibres, carbon fibres and the like) and colouring agents, can be added to the moulding compositions of the invention during preparation, working up, further processing and final moulding.

The final moulding can be carried out on commercially available processing units and includes, for example, processing by injection moulding, sheet extrusion, if appropriate with subsequent thermoforming, coldforming, extrusion of tubes and profiles, processing by calendering, and many others.

The graft polymers prepared according to the invention can furthermore be used as modifiers for increasing the toughness of individual thermoplastic moulding compositions or thermoplastic moulding compositions mixed from various materials. Examples of thermoplastic moulding compositions which can be modified are:

(a) other homo- and copolymers of styrene and alkyl-substituted styrene with monomers containing vinyl groups, for example polystyrene, poly(p-methyl)styrene, poly(styrene/co-maleic anhydride), poly(-styrene/co-acrylonitrile/co-maleic acid N-phenylimide) and poly(styrene/co-maleic acid N-phenylimide), (b) homo- and copolymers of $C_1$-$C_4$-alkyl (meth)acrylates with monomers containing vinyl groups, for example polymethyl methacrylate, poly(methyl methacrylate/costyrene), poly(methyl methacrylate/comaleic anhydride) and poly(methyl methacrylate/costyrene/comaleic anhydride), (c) halogen-containing polymers, for example polyvinyl chloride, polyvinylidene chloride and chlorinated polyethylene, (d) polycarbonates, for example those based on bisphenol A, tetramethylbisphenol A and tetrabromobisphenol A, (e) polyesters, for example those based on terephthalic acid, isophthalic acid, ethylene glycol and butanediol, and (f) polyamides, for example those based on ε-caprolactam, lauryllactam and adipic acid/hexamethylenediamine.

The graft rubbers prepared according to the invention are thereby employed in amounts of 1 to 80, preferably 5 to 50% by weight, based on the total moulding composition.

In the following examples, parts are always parts by weight and % is always % by weight, unless indicated otherwise.

EXAMPLES

EXAMPLES 1 to 8

50 parts (calculated as the solid) of an anionically emulsified polybutadiene latex prepared by free radical polymerization and with a $d_{50}$ value of about 260 nm were brought to a solids content of about 20% with water, after which the mixture was warmed to the reaction temperature, and 0.5 part of $K_2S_2O_8$ was added. Thereafter, 50 parts of a mixture of 36 parts of styrene, 14 parts of acrylonitrile and 0.15 part of tert.-dodecylmercaptan as well as 2 parts (calculated as the solid substance) of the sodium salt of a resin acid mixture (dissolved in alkaline water) were metered in over a period of 4 hours. Metering was carried out here in the manner described in Table 1. After an after-reaction time of 4 hours at the particular reaction temperature and after addition of about 1.0 part of a phenolic antioxidant, the graft latex was coagulated with a magnesium sulphate/acetic acid mixture and, after washing, the resulting powder was dried at 70° C. in vacuo.

45 parts of this graft polymer were mixed with 55 parts of a styrene/acrylonitrile resin (72:28, $\overline{M}_w$=115,000, $M_w/M_n$-1≦2), 2 parts of pentaerythritol tetrastearate and 0.1 part of a silicone oil in an internal kneader and the mixture was then injection moulded to give small standard bars and a sheet (for evaluation of the surface).

The following data were determined: notched impact strength at room temperature ($a_k^{RT}$ or $Izod^{RT}$) and at $-40°$ C. ($a_k^{40° C.}$ or $Izod^{-40° C.}$) in accordance with DIN 53 453 ($a_k$ in the unit: $kJ/m^2$) and ASTM 256-56 ISO/R 180 (Izod in the unit: J/m), ball indentation hardness ($H_c$) in accordance with DIN 53 456 (unit: $N/mm^2$) and the flow properties by determination of the melt volume index MVI in accordance with DIN 53 735U (unit: $cm^3/10$ minutes).

As can be seen from Table 1, the preparation, according to the invention, of the graft rubber leads to a significantly increased toughness, increased hardness values and improved flow properties, regardless of the reaction temperature used.

TABLE 1

| Moulding composition | Conditions during preparation of the graft rubber | | | | | Test data | | | | | | |
|---|---|---|---|---|---|---|---|---|---|---|---|---|
| | Reaction temperature | Monomer metering* | | | | $a_k^{RT}$ | $a_k^{-40° C.}$ | $Izod^{RT}$ | $Izod^{-40° C.}$ | $H_c$ | MVI | Gloss |
| | | 1 hour | 2 hours | 3 hours | 4 hours | | | | | | | |
| 1 | 60° C. | ½ | ¼ | ⅛ | ⅛ | 23.6 | 16.9 | 637 | 289 | 85 | 3.3 | + |
| 2 (Comparison) | 60° C. | ¼ | ¼ | ¼ | ¼ | 21.7 | 16.0 | 547 | 269 | 84 | 3.1 | + |
| 3 | 65° C. | ½ | ¼ | ⅛ | ⅛ | 19.2 | 15.0 | 509 | 255 | 87 | 5.7 | + |
| 4 (Comparison) | 65° C. | ¼ | ¼ | ¼ | ¼ | 18.6 | 13.3 | 514 | 267 | 83 | 4.8 | + |
| 5 | 70° C. | ½ | ¼ | ⅛ | ⅛ | 19.1 | 14.4 | 623 | 230 | 88 | 6.2 | + |
| 6 (Comparison) | 70° C. | ¼ | ¼ | ¼ | ¼ | 15.8 | 13.3 | 505 | 217 | 84 | 5.5 | + |
| 7 | 75° C. | ½ | ¼ | ⅛ | ⅛ | 16.8 | 13.0 | 555 | 189 | 87 | 7.1 | + |
| 8 (Comparison) | 75° C. | ¼ | ¼ | ¼ | ¼ | 14.9 | 11.2 | 433 | 163 | 83 | 6.3 | + |

*Total metering period = 4 intervals of time with Δt in each case 60 minutes.

EXAMPLES 9 to 14

50 parts (calculated as the solid) of an anionically emulsified polybutadiene latex prepared by free radical polymerization and with a $d_{50}$ value of about 342 nm were brought to a solids content of about 20% with water, after which the mixture was warmed to 65° C. and 0.5 part of $K_2S_2O_8$ was added. Thereafter, 50 parts of a mixture of 36 parts of styrene, 14 parts of acrylonitrile and 0.15 part of tert.-dodecylmercaptan as well as 2 parts (calculated as the solid substance) of the sodium salt of a resin acid mixture (dissolved in alkaline water) were metered in over the stated period of time in the particular manner stated in Table 2. The graft polymer was worked up in the manner described for Examples 1–8 and was mixed with the abovementioned styrene/acrylonitrile resin and processed into test specimens as described there.

As can be seen from Table 2, the preparation, according to the invention, of the graft rubber leads to moulding compositions of increased toughness, greater hardness and improved flow properties, regardless of the total metering time of the monomers.

TABLE 2

| Moulding composition | Conditions during preparation of the graft rubber Monomer metering* | | | | | | | | Test data | | | | | | |
|---|---|---|---|---|---|---|---|---|---|---|---|---|---|---|---|
| | 1 h | 2 h | 3 h | 4 h | 5 h | 6 h | 7 h | 8 h | $a_k^{RT}$ | $a_k -40°C$ | $Izod^{RT}$ | $Izod -40°C$ | $H_c$ | MVI | Gloss |
| 9 | ¼ | ¼ | ¼ | ¼ | — | — | — | — | 23 | 16 | 600 | 273 | 84 | 4.4 | + |
| 10(Comparison) | ¼ | ¼ | ¼ | ¼ | — | — | — | — | 21 | 15 | 589 | 260 | 81 | 4.0 | + |
| 11 | 4/12 | 3/12 | 2/12 | 1/12 | 1/12 | 1/12 | — | — | 22 | 15 | 558 | 266 | 83 | 5.2 | + |
| 12(Comparison) | 1/6 | 1/6 | 1/6 | 1/6 | 1/6 | 1/6 | — | — | 20 | 14 | 584 | 255 | 78 | 5.1 | + |
| 13 | 5/16 | 4/16 | 2/16 | 1/16 | 1/16 | 1/16 | 1/16 | 1/16 | 20 | 14 | 538 | 252 | 80 | 6.4 | + |
| 14(Comparison) | ⅛ | ⅛ | ⅛ | ⅛ | ⅛ | ⅛ | ⅛ | ⅛ | 18 | 14 | 489 | 223 | 77 | 5.7 | + |

*Total metering period:
4 intervals of time with Δt in each case 60 minutes or
6 intervals of time with Δt in each case 60 minutes or
8 intervals of time with Δt in each case 60 minutes.

EXAMPLES 15 to 22

50 parts (calculated as the solid) of an anionically emulsified polybutadiene latex prepared by free radical polymerization and with a $d_{50}$ value of about 438 nm were brought to a solids content of about 20% with water, after which the mixture was warmed to 65° C. and 0.5 part of $K_2S_2O_8$ was added. Thereafter, 50 parts of a mixture of 36 parts of styrene and 14 parts of acrylonitrile with or without the addition of 0.15 part of tert.-dodecylmercaptan as well as 2 parts (calculated as the solid substance) of the sodium salt of a resin acid mixture (dissolved in alkaline water) were metered in over a period of 4 hours as shown in Table 3. After an after-reaction time of 4 hours, the graft latex was worked up as described for Examples 1 to 8.

After the graft polymer had been mixed with the abovementioned styrene/acrylonitrile resin as shown in Table 3, test specimens were produced.

The results given in Table 3 show that the graft rubbers prepared according to the invention via specific metering and simultaneous addition of a mercaptan lead to improved toughnesses, hardnesses and flow properties at all the graft/resin ratios.

TABLE 3

| Moulding composition | Conditions during preparation of the graft rubber | | | | | Graft:Resin ratio [parts by weight] | $Izod^{RT}$ | $Izod -40°C$ | $a_k -40°C$ | $H_c$ | MVI |
|---|---|---|---|---|---|---|---|---|---|---|---|
| | Monomer metering* | | | | t-dodecyl-mercaptan | | | | | | |
| | 1 hour | 2 hours | 3 hours | 4 hours | | | | | | | |
| 15 | ¼ | ¼ | ¼ | ¼ | 0.15 | 30:70 | 444 | 117 | 9.4 | 111 | 6.9 |
| 16 (comparison) | ¼ | ¼ | ¼ | ¼ | — | 30:70 | 424 | 119 | 9.1 | 108 | 6.7 |
| 17 | ¼ | ¼ | ¼ | ¼ | 0.15 | 40:60 | 651 | 190 | 14.6 | 92 | 5.9 |
| 18 (Comparison) | ¼ | ¼ | ¼ | ¼ | — | 40:60 | 606 | 232 | 14.1 | 90 | 5.0 |
| 19 | ¼ | ¼ | ¼ | ¼ | 0.15 | 50:50 | 678 | 312 | 17.3 | 77 | 3.9 |
| 20 (Comparison) | ¼ | ¼ | ¼ | ¼ | — | 50:50 | 653 | 296 | 16.2 | 75 | 3.2 |
| 21 | ¼ | ¼ | ¼ | ¼ | 0.15 | 60:40 | 657 | 345 | 20.0 | 63 | 2.4 |
| 22 (Comparison) | ¼ | ¼ | ¼ | ¼ | — | 60:40 | 598 | 340 | 17.9 | 61 | 2.2 |

*Total metering period: 4 intervals of time with Δt in each case 60 minutes

We claim:

1. A process for the preparation of a thermoplastic moulding composition of
10 to 65% by weight of at least one graft polymer obtained by emulsion polymerization of (a) styrene, α-methylstyrene, methyl methacrylate or a mixture thereof with (b) acrylonitrile in a weight ratio of (a) to (b) of 90:10 to 50:50, in the presence of (c) at least one latex of a rubber base, where the weight ratio of (a) plus (b) to (c) is 20:80 to 70:30, and
90 to 35% by weight of a copolymer of (d) styrene, α-methylstyrene, methyl methacrylate or a mixture thereof and (e) acrylonitrile in a weight ratio of (d) to (e) of 90:10 to 50:50,
characterized in that, to prepare the graft polymer, (a), (b) and 0.05 to 1.00 part by weight over time intervals (Δt) which are each 5 to 100 minutes long wherein the amount of (a) plus (b) added time interval ($Δt_{n+1}$) is 0.30 to 0.95 times the amount of (a) plus (b) added in the preceding time interval ($Δt_n$) at least in the first half of the total time intervals, where n=3 to 30.

2. A process according to claim 1, in which (c) is (i) a polybutadiene rubber comprised of homopolymerized butadiene, (ii) a styrene butadiene rubber comprised of butadiene copolymerized with up to 30% by weight of styrene and acrylate rubber or (iii) an ethylene propylene diene monomer rubber.

3. A process according to claim 1, in which the amount of (a) plus b) added in each time interval ($Δt_{n=1}$) is 0.40 to 0.90 times the amount of (a) plus (b) added in the preceding time interval ($Δt_n$) at least during the first half of the total time intervals.

4. A process according to claim 1 wherein n=3 to 15, and Δt is 10 to 90 minutes long.

5. A thermoplastic moulding composition prepared by the process of claim 1.

* * * * *